Feb. 11, 1930.   R. E. GALER   1,746,698
STEAK BROILER
Filed March 6, 1928   2 Sheets-Sheet 1
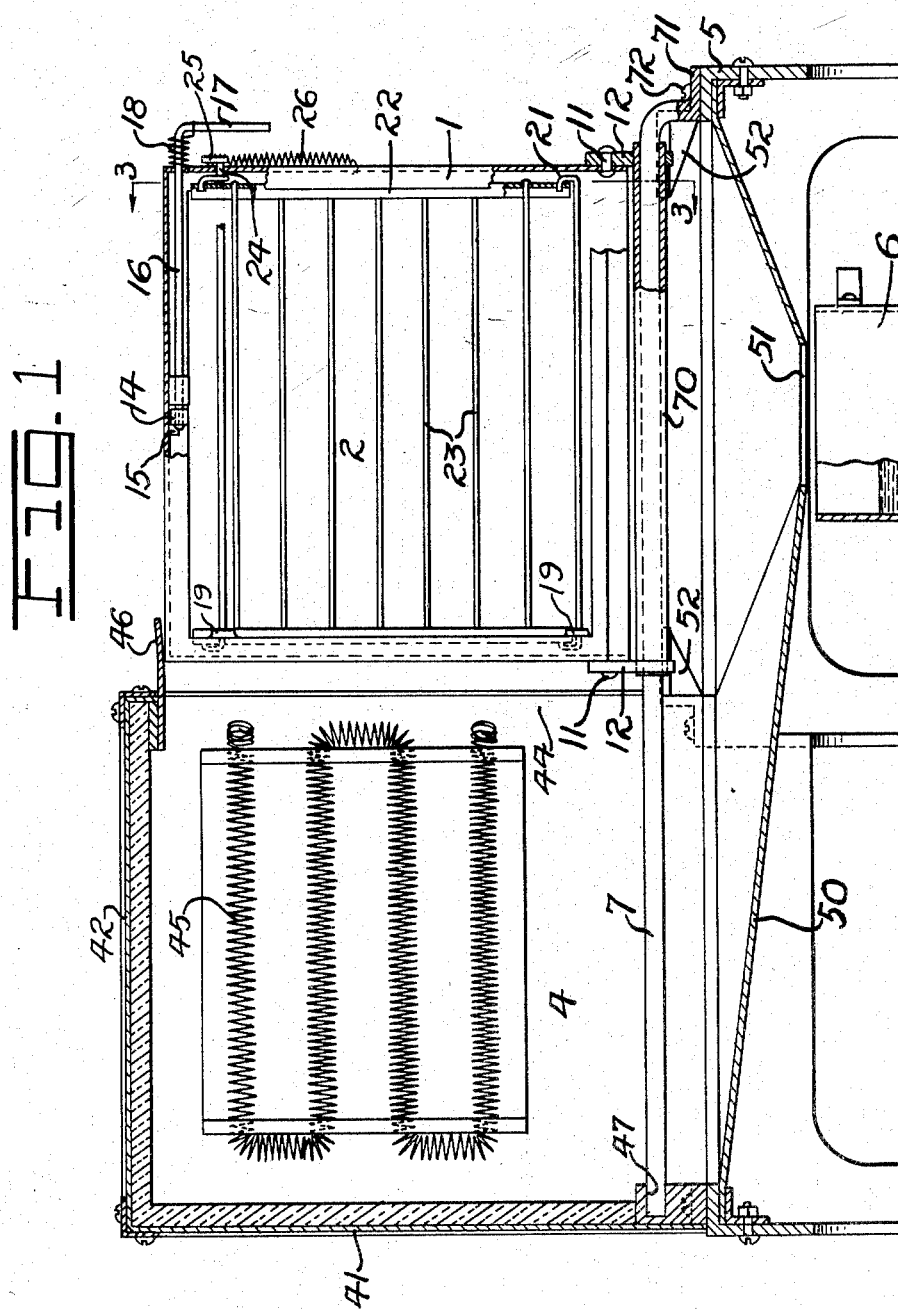
Inventor
Robert E. Galer
By Reynolds & Reynolds
Attorneys

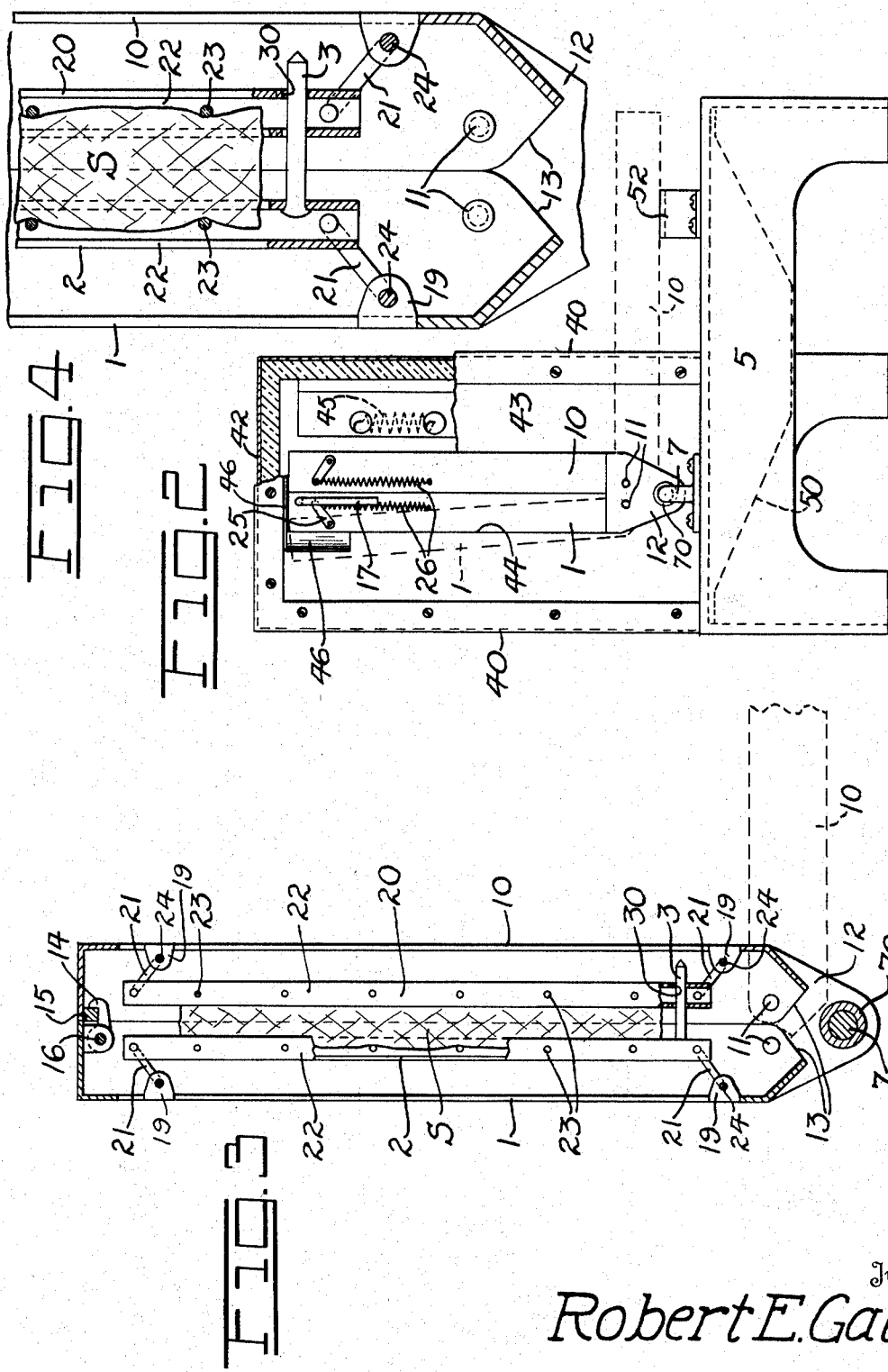

Patented Feb. 11, 1930

1,746,698

UNITED STATES PATENT OFFICE

ROBERT E. GALER, OF SEATTLE, WASHINGTON, ASSIGNOR, BY DIRECT AND MESNE ASSIGNMENTS, TO MINUTE ELECTRIC BROILER, OF SEATTLE, WASHINGTON, A CORPORATION OF WASHINGTON

STEAK BROILER

Application filed March 6, 1928. Serial No. 259,456.

My invention relates to electric cooking appliances, and is particularly designed as a broiler for steaks, chops, fish and the like, although it may be used as well as a toaster, if desired.

In broiling steaks, it is particularly desirable that the steak be broiled upon both sides at once, and that it be held, while broiling, in a vertical position so that the fat will not run down upon the steak, or through it to permeate it, but will, so far as possible, drip off immediately and be led away. The accomplishment of this, then, is one object of my invention.

It is not enough that the steak be broiled upon both sides at once. It must have its faces equidistant from the electric elements at its opposite sides, and quite close thereto, so as to sear it and retain the palatable juices, and to cook it through quickly. Whatever its thickness, it must always be supported to conform to the above requirements, and thus there is presented the problem of providing a means for holding a steak, which is liable to stick upon touching a hot grill or like surface, and so flaccid that it must usually be positioned while horizontal, and be held firmly while vertical, in a vertical position, and equidistant from the adjacent heating elements. Added to this, these means must be such as will not require conscious effort of the chef or housewife to position the steak properly, nor be cumbersome or difficult to insert in the broiler.

A further, and principal object of my invention, then, is to provide a simple steak-holding means for use with a broiler or for any like purpose, whereby the steak is automatically, without effort or thought on the part of the cook, held equidistant from the cooking elements which are at opposite sides thereof.

A further object is a general simplification of devices for the purpose indicated, rendering them cheap and convenient to use.

Other objects, and particularly such as relate to the structure of the device, will be readily ascertainable from a study of the following specification, of the drawings forming a part thereof, and of the claims which terminate this specification.

My invention comprises the novel parts and the novel combination and arrangement thereof, as shown in the accompanying drawings, described in the specification, and more particularly defined by the claims which terminate the same.

In the accompanying drawings, I have shown my invention in a form which is now preferred by me.

Figure 1 is a general side elevation of the broiler, the broiling chamber and frame being shown in section, and other parts being broken away.

Figure 2 is a general end elevation of the broiler.

Figure 3 is a general section of the steak holder on the line 3—3 of Figure 1.

Figure 4 is a section somewhat similar to Figure 3 on a larger scale, showing a steak held in place.

To a large extent, the specific construction of the broiler chamber and frame are no part of my present invention, other than as the broiling chamber is arranged so that the steak may be placed therein on edge, or in a vertical plane, with heating elements equidistant therefrom at opposite sides, and provided there are means for conveying away the hot grease, which drips from the steak, so that it will not catch fire. Thus I provide a frame 5 which is largely open in its center to permit the insertion of a grease pan 50 which slopes toward an outlet opening 51, beneath which a suitable collecting trough or dish 6 may be placed. It will be noted that the discharge opening 51 lies outside of the area of the broiling chamber 4 and that the grease pan 50 is so inclined that any grease which drops thereinto from the broiling chamber is immediately carried outside of the broiling chamber, so that the danger of fire is largely eliminated.

The broiling chamber 4 is defined by side walls 40, a closed end wall 41, a top wall 42, and an open end wall 43, this latter wall having an opening 44 through which the steak holder is inserted. These various walls may be suitably insulated to retain the heat, and the steak holder may, as will be seen hereafter, be of such shape and size as to substantially fill the opening 44, thus conserving, to the largest degree possible, the heat of the heating elements 45 within the chamber 4, and at opposite sides thereof.

To hold the steak I provide two complemental frames, 1 and 10. These frames are substantially alike and are adapted to meet along a common plane or to swing open to permit the insertion of a steak. As a means of supporting these frames, though any suitable means might be employed, I have shown a pivot support for each of them at 11, upon ears 12. I have also shown these frames as provided with inclined stop surfaces, 13, which are adapted to come into contact when the frames are swung open, to limit the opening of these frames to 90° or perhaps a little more. To hold them together I may provide a latch 14 on one frame, as 1, engaging a lug or ear 15 of the other frame, the latch being supported upon an oscillable shaft 16, carrying an operating handle 17, the latch being held in position by such means as the spring 18. Obviously, any other suitable means which will releasably hold the two frames together might be employed.

Preferably, the two frames 1 and 10 do not themselves directly engage the steak, but for this purpose I provide grills 2 and 20, which are supported by the respective frames 1 and 10, but are movable relative thereto. The supports for these grills are such that they are maintained, in all positions, in parallel planes, and for this purpose I may employ the equal parallel links 21 pivoted at one end to the respective frames 1 and 10, as at 19, and at the other end to the opposite edges of the grills 2 or 20. The grills themselves may consist simply of vertical members 22, shown here as of channel shape in cross-section, connected by wires 23. These wires, then, engage and hold a steak between them, clamping it in place.

To secure this clamping effect, that is, to yieldingly urge the two grills 2 and 20 toward each other, I may extend one of the pivot shafts of the parallel links, as indicated at 24, outward through its supporting frame 1 or 10, and upon the end thereof secure a link 25, to which is secured a tension spring 26. The two springs 26 urge their respective grills towards each other or towards a common plane of contact, which is the plane of separation between the two frames 1 and 10.

It will be understood that this common plane of contact, as defined above, is equidistant from the opposite outer faces of the frames 1 and 10, and that it is this fact which determines the equal spacing of this plane of contact from the pair of heating elements 45, which are outside of the frames 1 and 10. If it should happen, in a particular design that the plane of separation between the frames 1 and 10 was not equidistant from the heating elements, then the plane of contact would not coincide therewith. It is always the intention to urge the two grills together in such a manner that they lie in planes which are equidistant from the heating elements.

Supported as described above, these grills might tend one to overcome the other, depending upon the relative strength of the springs 26, the way in which the steak is placed between the grills, and the like. To prevent this, and to maintain them always equidistant from the plane of contact, I provide such means as a pin 3, supported on one of the grills, as 2, and projecting toward the other grill 20. The latter grill is provided with a hole 30 which receives the pin 3. Now if the grill 20, for example, tends to fall toward the plane of contact, the arc of swing of the links 21 will tend to carry it down, but the engagement between the hole 30 and the pin 3 will equally urge the grill 2 down and towards the plane of contact, and both will be maintained equidistant therefrom in all positions.

To guide the frames 1 and 10 for movement into and from the chamber 4, the ears 12 may form part of a slide and be connected by a sleeve 70, which is supported on and which slides along a rod 7 extending into the open end of the chamber 4. In order to permit ready removal of this rod and cleaning of the broiler when this is desirable, the rod 7 may have one end received in a socket 47 within the chamber 4, and at its outer end it may be bent downward and have a flange 71 which is securable to the frame 5 by such means as the screws 72, which renders it readily removable.

To enable easy insertion of the frame 1—10, I may provide the guide flanges 46 at the entrance to the opening 44, with which the frame 1 may be engaged as it swings up. It will be noted that the composite frame 1—10 may pivot as a unit on the rod 7, the sleeve 70 and ear 12 swinging with it; and thus it may be laid horizontally on the frame. To support it in this horizontal position, I may provide lugs or supports 52 upon an extension of the frame, upon which, as indicated in Figure 2, the frame may rest. Preferably, the grease pan 50 extends beneath this portion, so that when the frame is laid over in this horizontal position with a steak therein, the grease will still be received in the grease pan.

When in this position, or when held vertical, the two frame members 1 and 10 may be separated by releasing the latch 14, whereupon they may be pivoted independently of each other on the independent pivot 11 carried by the ears 12, and thus may be swung open to receive a steak S as indicated in dotted lines in Figure 3. Ordinarily, the frame would be placed in horizontal position before separating the frames to place a steak between them, or upon the grill 20. Then the frame 1 with its grill 2 would be swung down to clamp and hold the steak, and the latch 14 engaged. The frame thus closed would be raised to vertical position, engaged with a flange 46 to guide it into position, and pushed into the chamber 4, where it would remain for a sufficient period to cook the steak properly, then withdrawn and opened in a manner the reverse of that described. It will be noted throughout these operations that control of the frames is obtained through the use of the handle 17, rendering it very convenient to use.

What I claim as my invention is:

1. A steak broiler comprising an enclosed broiling chamber open at one end, two complemental vertical frame members supported and guided for movement thereinto and therefrom, and means supporting the complemental frames to swing jointly on a common axis when outside of said chamber, or to permit either frame to swing angularly to the other to separate their edges distant from such axis, and a steak-engaging grill carried by each of said frame members.

2. A steak broiler comprising an enclosed broiling chamber open at one end, two complemental vertical frame members supported and guided for movement thereinto and therefrom, the complemental frames being swingable jointly on a common axis when outside of said chamber, or being separable at their edges distant from such axis, a steak-engaging grill carried by each of said frame members, and means carried by each of said grills for maintaining them, for any amount of separation, equidistant from a common plane of contact.

3. A steak broiler comprising an enclosed broiling chamber open at one end, two complemental vertical frame members adapted to close said open end, and means guiding and supporting said frame members for movement jointly into and from said chamber, said two frame members being adapted to separate to receive a steak between them, and said supporting means including means permitting conjoint movement of said frame members into horizontal position.

4. A steak broiler comprising an enclosed broiling chamber open at one end, two complemental vertical frame members adapted to close said open end, and means supporting and guiding said frame members for movement jointly into and from said chamber, said two frame members being adapted to separate to receive a steak between them, and said guiding means including means permitting conjoint movement of said frame members into horizontal position, and means associated with said frames for automatically centering a steak supported therein with respect to the opposite faces of the frames.

5. A steak broiler comprising an enclosed broiling chamber open at one end, two vertical steak holding frame members movable thereinto and therefrom, means supporting and guiding the composite frame thus formed at its lower edge, and permitting swinging of said composite frame as a unit, when withdrawn from said chamber, between horizontal and vertical positions, and also permitting independent angular movement of the two frame members to clamp or remove a steak.

6. A steak broiler comprising an enclosed broiling chamber open at one end, a rod extending within said open end, a sleeve slidable along said rod, two complemental steak-holding frames each pivoted upon said sleeve to swing angularly thereon relative to the other frame, when withdrawn from said chamber, and to swing conjointly with said sleeve as a unit.

7. A steak broiler comprising an enclosed broiling chamber open at one end, a rod extending within said open end, a sleeve slidable along said rod, two complemental steak-holding frames each pivoted upon said sleeve to swing angularly thereon relative to the other frame, when withdrawn from said chamber, and to swing conjointly with said sleeve as a unit, two complemental steak-engaging grills, each supported in its respective frame, and means for automatically centering a steak held in said grills relative to the side faces of said frames.

8. A steak broiler comprising a frame, an enclosed broiling chamber on said frame and open at one end, a socket therein opposite said open end, a rod extending within said open end and having one end received in said socket, its opposite end being removably secured to said frame, a steak-supporting frame movable into and from said chamber, and means for supporting and guiding said frame upon said rod.

9. In a broiler, steak holding means comprising two complemental frames, means pivotally supporting each frame by an edge to swing open, and a grill supported in and movable relative to each of said frames, and cooperating with the opposite grill to hold a steak therebetween.

10. In a broiler, steak holding means comprising two complemental frames, means pivotally supporting each frame by an edge to swing open, and a grill supported in and movable relative to each of said frames, and cooperating with the opposite grill to hold a steak therebetween, means urging said grills towards each other in parallel planes, and means interengageable therebetween to maintain them equidistant, at any spacing, from a common plane of contact.

11. In a broiler, steak holding means comprising two complemental frames, means pivotally supporting each frame by an edge to swing open, a pair of complemental grills adapted to clamp a steak therebetween, equal parallel links at opposite edges of each grill supporting it from its respective frame, means urging said grills towards a common contact plane, and means for maintaining said grills, at any spacing, equidistant from such contact plane.

12. In a broiler, steak holding means comprising two complemental frames, means pivotally supporting each frame by an edge to swing open, a pair of complemental grills adapted to clamp a steak therebetween, equal parallel links at opposite edges of each grill supporting it from its respective frame, means urging said grills towards a common contact plane, a pin carried by one grill, and the complemental grill having a hole adapted to receive said pin, whereby said grills are automatically, and for any spacing, maintained equidistant from such contact plane.

13. The combination with a pair of complemental grills, equal parallel links supporting opposite edges of each grill, and means yieldingly urging said grills towards a common contact plane, of means for maintaining said grills equally spaced at all times from such contact plane comprising a pin projecting from one grill towards the second, the second grill having a hole of a size to receive said pin.

14. In a broiler, steak holding means comprising a pivot support, two complemental frames each pivoted by an edge upon said support to swing open, a pair of complemental grills adapted to clamp a steak therebetween, equal parallel links at opposite edges of each grill supporting it for movement in parallel planes from its respective frame, means yieldingly urging said grills towards a common contact plane, means for maintaining said grills, at any spacing equidistant from such contact plane, and a catch normally holding said frames in contact, and releasable to swing them open.

15. In a broiler, two complemental frame members, means supporting said frame members to pivot jointly on a common axis, or permitting independent swinging of either frame on such axis, and means carried by said frames for engaging food to be broiled.

16. In a broiler, two complemental frame members, means carried thereby for engaging and clamping food to be broiled, a pivot support engaged by each of said frames at one edge, means connecting said frames to swing on said support jointly from an upright to a horizontal position, or vice versa, said latter means being releasable to permit independent swinging of either frame on such support.

17. In a broiler, two complemental separable frame members, a meat-engaging rack associated with each of said frame members, means supporting each of said racks from its frame member for movement towards and from a common median plane, means constraining such racks to coequal movement towards and from such median plane, and two heating elements positioned, when said frames are closed and in broiling position, equidistant from and at opposite sides of said median plane.

Signed at Seattle, King County, Washington this 20th day of January, 1928.

ROBERT E. GALER.